(12) United States Patent
Onuma

(10) Patent No.: US 12,109,713 B2
(45) Date of Patent: Oct. 8, 2024

(54) REMOTE ROBOT SYSTEM AND METHOD OF CONTROLLING REMOTE ROBOT SYSTEM

(71) Applicant: TOYOTA JIDOSHA KABUSHIKI KAISHA, Toyota (JP)

(72) Inventor: Yuji Onuma, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 17/715,186

(22) Filed: Apr. 7, 2022

(65) Prior Publication Data

US 2023/0321834 A1 Oct. 12, 2023

(30) Foreign Application Priority Data

Apr. 14, 2021 (JP) .................................. 2021-068229

(51) Int. Cl.
*B25J 9/16* (2006.01)
*B25J 13/00* (2006.01)
*B25J 13/06* (2006.01)

(52) U.S. Cl.
CPC ........... *B25J 9/1689* (2013.01); *B25J 9/1697* (2013.01); *B25J 13/003* (2013.01); *B25J 13/06* (2013.01)

(58) Field of Classification Search
CPC ...... B25J 9/1689; B25J 9/1697; B25J 13/003; B25J 13/06; B25J 9/00; B25J 9/16; B25J 11/0005; B25J 19/026; G05B 2219/40411; G06F 18/24; G06V 40/20
See application file for complete search history.

(56) References Cited

U.S. PATENT DOCUMENTS

| | | | |
|---|---|---|---|
| 10,244,208 B1* | 3/2019 | Deng | H04N 7/157 |
| 2017/0075348 A1 | 3/2017 | Kratz et al. | |
| 2018/0070093 A1* | 3/2018 | Shin | H04L 65/00 |
| 2018/0365759 A1* | 12/2018 | Balzer | G06V 40/18 |
| 2018/0373239 A1 | 12/2018 | Tsubota et al. | |
| 2019/0202060 A1* | 7/2019 | Aaron | H04R 1/028 |
| 2019/0240842 A1* | 8/2019 | Hsu | H04W 4/80 |
| 2020/0168113 A1* | 5/2020 | Rodriguez Bravo | G06V 10/17 |
| 2021/0354305 A1* | 11/2021 | Kim | B25J 13/003 |
| 2022/0187912 A1* | 6/2022 | Alcaide | G06F 9/542 |

FOREIGN PATENT DOCUMENTS

| | | | | |
|---|---|---|---|---|
| JP | 2014-050465 A | | 3/2014 | |
| JP | 2016-224583 A | | 12/2016 | |
| JP | 2017054475 A | | 3/2017 | |
| JP | 2019005819 A | | 1/2019 | |
| JP | 2020005147 A | | 1/2020 | |
| KR | 2020107619 A | * | 9/2020 | ......... G06K 9/00335 |

* cited by examiner

*Primary Examiner* — Adam R Mott
*Assistant Examiner* — Byron Xavier Kasper
(74) *Attorney, Agent, or Firm* — Dinsmore & Shohl LLP

(57) ABSTRACT

A remote robot system and a method of controlling a remote robot system capable of responding appropriately according to a user are provided. A remote robot system includes: a robot configured to perform a predetermined operation including collection of local information near the robot; a guide terminal capable of remotely operating the operation of the robot; and a participant terminal capable of remotely communicating with the guide terminal, in which the participant terminal includes: a display panel configured to output the local information acquired from the robot to the user; and an interest detection unit configured to detect user's interest in the output local information.

12 Claims, 14 Drawing Sheets

REMOTE ROBOT SYSTEM AND METHOD OF CONTROLLING REMOTE ROBOT SYSTEM

CROSS REFERENCE TO RELATED APPLICATIONS

This application is based upon and claims the benefit of priority from Japanese patent application No. 2021-068229, filed on Apr. 14, 2021, the disclosure of which is incorporated herein in its entirety by reference.

BACKGROUND

The present disclosure relates to a remote robot system and a method of controlling the remote robot system.

Recent techniques have enabled autonomous travelling robots to be remotely operated by users using operation terminals. Further, a telepresence robot including, for example, a camera, a microphone, and a monitor, which is one example of the above robots, enables users to communicate with each other remotely or enjoy virtual experiences remotely. Further, in view of a recent spread of remote services such as Web meeting services, it is expected that robots that can be remotely operated or can be used for remote communication will be used in a broad range.

With regard to operations performed by users, for example, Japanese Unexamined Patent Application Publication No. 2016-224583 discloses a technique in which an analysis server apparatus analyzes the behavior of a user viewing Web pages by a heat map. Further, Japanese Unexamined Patent Application Publication No. 2014-50465 discloses a technique in which an image processing apparatus that displays a medical image such as an X-ray CT image designates an area that a user is interested in to make a diagnosis.

SUMMARY

By using a robot such as a telepresence robot, a remote sightseeing tour which enables users to remotely join and virtually experience this tour can, for example, be provided. In a remote robot system for a remote sightseeing tour, for example, a tour guide (an operator) remotely operates a robot and users (participants) who join this tour remotely communicate with the guide. In this remote robot system, however, it is difficult to respond appropriately according to the users since the guide and the users are present in places away from each other. The technique disclosed in Japanese Unexamined Patent Application Publication No. 2016-224583 is to analyze Web page views and the technique disclosed in Japanese Unexamined Patent Application Publication No. 2014-50465 is to specify a diagnosis area of a medical image. Neither of them solves the above-described problem.

The present disclosure has been made in order to solve the aforementioned problem and provides a remote robot system and a method of controlling the remote robot system capable of responding appropriately according to a user.

A remote robot system according to one aspect of the present disclosure includes: a robot configured to perform a predetermined operation including collection of local information near the robot; a first remote terminal capable of remotely operating the operation of the robot; and a second remote terminal capable of remotely communicating with the first remote terminal, in which the second remote terminal includes: an information output unit configured to output the local information acquired from the robot to a user; and an interest detection unit configured to detect user's interest in the output local information. Accordingly, the user's interest detected by the second remote terminal can be detected, whereby it becomes possible to recognize the user's interest and respond appropriately according to the user even when the first remote terminal is away from the second remote terminal.

Further, the interest detection unit may detect an operation state by the user in response to the output local information and detect the user's interest based on the operation state that has been detected. Further, the operation state may include an operation position, the number of times of operations, or an operation time in the user's operation performed on a display screen that displays the local information. Accordingly, it is possible to accurately detect the interest in accordance with the state in which the user has operated.

The interest detection unit may further detect an utterance state of the user in response to the output local information and detect the user's interest based on the utterance state that has been detected. Further, the utterance state may include a sound pressure of a voice emitted by the user, an utterance time of the voice, or results of recognizing the voice. Accordingly, it is possible to accurately detect the interest in accordance with the state of the voice emitted by the user.

The interest detection unit may further detect an attention state by the user in response to the output local information and detect the user's interest based on the attention state that has been detected. Further, the attention state may include the orientation of the face of the user, the orientation of the line of sight of the user, an attention position of the user, or an attention time of the user. Accordingly, it is possible to accurately detect the interest in accordance with the state in which the user is focusing on.

The second remote terminal may further include a notification unit configured to notify the first remote terminal of interest information indicating the detected interest. Accordingly, it is possible to definitely send feedback on the user's interest detected by the second remote terminal to the first remote terminal.

The first remote terminal may include an interest output unit configured to output the interest information that has been sent. Further, the interest output unit may highlight a position that corresponds to the interest information on a display screen that displays the local information. The interest output unit may further display a temporal change of the interest information on a display screen that displays the local information. This enables the first remote terminal to instantly recognize the user's interest detected by the second remote terminal.

Further, the first remote terminal may include a remote control determination unit configured to determine a method of remotely operating the robot based on the interest information that has been sent. Further, the remote control determination unit may determine a method of moving a robot including a moving direction, a moving path, or a moving speed of the robot based on the interest information. The remote control determination unit may further determine an information acquisition method of the robot including an imaging direction of an image of the robot or a voice collection direction based on the interest information. Accordingly, it is possible to remotely control a robot appropriately in accordance with the user's interest detected by the second remote terminal.

A method of controlling a remote robot system according to one aspect of the present disclosure is a method of controlling a remote robot system including: a robot configured to perform a predetermined operation including collection of local information near the robot; a first remote terminal capable of remotely operating the operation of the robot; and a second remote terminal capable of remotely communicating with the first remote terminal, in which the second remote terminal outputs the local information acquired from the robot to a user, and detects user's interest in the output local information. Accordingly, the user's interest detected by the second remote terminal can be detected, whereby it is possible to recognize the user's interest and respond appropriately according to the user even when the first remote terminal is away from the second remote terminal.

According to the present disclosure, it is possible to provide a remote robot system and a method of controlling the remote robot system capable of responding appropriately according to a user.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments of the present disclosure will be described. Throughout the drawings, the same elements are denoted by the same reference symbols and overlapping descriptions are omitted as appropriate. While the present disclosure will be described with reference to the embodiments, the present disclosure set forth in the claims is not limited to the following embodiments. Further, not all the components described in the following embodiments are necessary for solving problems.

First Embodiment

Figure 1:
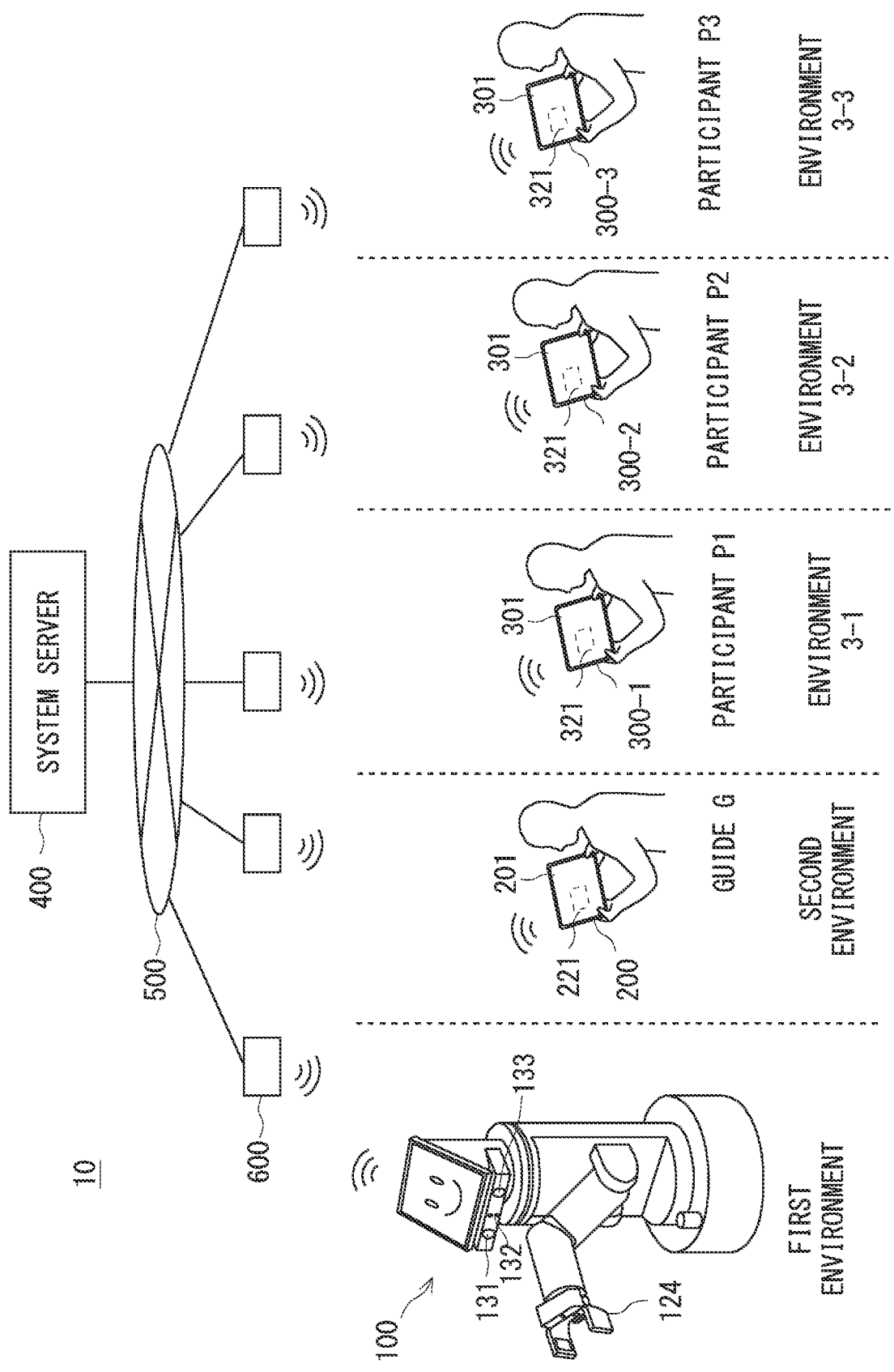
FIG. 1 is a configuration diagram showing a configuration example of a remote robot system according to a first embodiment.

First, a first embodiment according to the present disclosure will be described. FIG. 1 shows a configuration example of a remote robot system 10 according to this embodiment. As shown in FIG. 1, the remote robot system 10 according to this embodiment includes a robot 100, a guide terminal (first remote terminal) 200, a plurality of participant terminals (second remote terminals) 300 (e.g., 300-1 to 300-3), and a system server 400.

The remote robot system 10 is a system in which a guide (tour guide) G remotely operates the robot 100 located in a tourist spot (a first environment) by operating the guide terminal 200 and participants P are able to virtually experience a sightseeing tour via the robot 100 that has been remotely operated. In the remote robot system 10, a plurality of participants P (e.g., P1 to P3) and the guide G are connected to the robot 100, which is, for example, a telepresence robot, via terminal apparatuses, and the plurality of participants P are able to enjoy the remote sightseeing tour via the robot 100 while sharing video images/voices acquired by the robot 100. One of the users connected to the robot 100 is the guide G, who gives a tour of the tourist spot while changing the travelling direction or the angle of view of the robot by remotely operating the robot 100. The participants P enjoy sightseeing from remote places while watching and listening to the video images/voices of the robot 100 and the guide G. In this tour, the guide G needs to give a tour of the tourist spot in accordance with interest of the participants P, but it is difficult for the guide G to appropriately give the tour on his/her connection terminal in accordance with the interest of the participants P because the guide G cannot see the reactions of the participants P due to the distance between their respective positions. In order to solve this problem, in this embodiment, interest of the participants P is detected, and the detected interest is further fed back to the guide G, which enables the guide G to guide the tour in accordance with the interest of the participants P.

Note that a plurality of robots 100 may be installed so that the remote operation and the virtual experience can be provided for the respective participants. Further, a plurality of guide terminals 200 may be included so that a plurality of guides G may be able to remotely operate the plurality of robots 100.

As shown in FIG. 1, the robot 100, the guide terminal 200, and the plurality of participant terminals 300 are located in environments away from one another (a first environment, a second environment, and a third environment) and are connected to the system server 400 via wireless routers 600 and the Internet 500. For example, the system server 400 provides data, processing, services and the like that are necessary for the remote operation or remote communication for the robot 100, the guide terminal 200, and the participant terminals 300. For example, while the wireless routers 600, the robot 100, the guide terminal 200, and the participant terminals 300 can communicate with one another via a wireless LAN, they may communicate with one another by mobile phone communication such as Long Term Evolution (LTE) or 5th Generation Mobile Communication System (5G). By using mobile phone communication for the communication of the robot 100, the robot 100 can be used in a large number of places, whereby it becomes possible to remotely operate robots 100 installed in various places. In this case, the wireless routers 600 may be base stations of mobile phone communication.

The robot 100 is able to execute a predetermined operation including collection of local information (including, for example, images or voices) near the robot 100 in the first environment. The robot 100 is remotely operated by the guide G, who is a remote operator and is in the second environment located away from the first environment, operating the guide terminal 200 (operation terminal) via the system server 400 connected to the Internet 500. The robot 100 receives various kinds of operation signals from the guide terminal 200 and executes, for example, a moving operation and/or an imaging operation. Further, the guide G and the participants P are able to remotely communicate with each other via the robot 100.

The robot 100 captures images of a space near the robot 100 by a camera 131 (an imaging unit) and transmits the captured images (video images) to the guide terminal 200 and the participant terminals 300 via the Internet 500. Further, a microphone 132 collects voices emitted near the robot 100, and transmits the collected voices to the guide terminal 200 and the participant terminals 300 via the Internet 500. Further, the robot 100 receives voices from the guide terminal 200 and the participant terminals 300 via the Internet 500 and outputs the received voices from the speaker 133. The robot 100 is able to execute a grasping motion or the like performed by a hand 124 in accordance with an operation performed by the guide terminal 200. It is therefore possible to provide various kinds of virtual experience in a sightseeing tour.

While the Internet 500 is used as a network to which the robot 100, the guide terminal 200, the participant terminals 300, etc. are connected in this embodiment, the network may be other types of network such as an intranet. Alternatively, the robot 100, the guide terminal 200, and the participant terminals 300 may be directly connected to each other through near-field communication such as Bluetooth (Registered Trademark) without using any network interposed therebetween. That is, the remote control and the remote communication may be performed without using the Internet 500 and the system server 400 interposed therebetween.

The guide terminal 200, which is a terminal operated by the guide G in the second environment, remotely operates the robot 100 and performs remote communication with the participant terminals 300 and the robot 100. The participant terminals 300 (e.g., 300-1 to 300-3), which are terminals operated by participants P (e.g., participants P1 to P3) in the third environment (e.g., environment 3-1 to environment 3-3), perform the remote operation with the guide terminal 200, other participant terminals 300, and the robot 100.

The guide terminal 200 and the participant terminals 300 are, for example, tablet terminals and include display panels 201 and 301 on which touch panels are superimposed thereon. The display panels 201 and 301 are able to display the captured images received from the robot 100 and the guide G and the participants P can visually recognize a situation in the spatial area near the robot 100 in an indirect manner. In other words, the display panel 201 is an information output unit configured to output local information of the robot 100 to the guide G and the display panel 301 is an information output unit configured to output local information of the robot 100 to the participants P (user).

Further, the guide terminal 200 and the participant terminals 300 are able to output voices received from the robot 100, and the guide G and the participants P can listen to the voices emitted near the robot 100 in an indirect manner. The guide G is able to cause various kinds of operation signals for operating the robot 100 to be generated by operating the guide terminal 200 via the touch panel. The generated operation signal is transmitted to the robot 100 via the Internet 500.

Further, the participant terminal 300 includes an interest detection unit 321 that detects interest of the participants P in the local information of the robot 100 that has been output. The interest detection unit 321 generates interest information indicating the interest of a participant P in accordance with the operation of the display screen of the display panel 301 by the participant P via the touch panel. The generated interest information is transmitted to the guide terminal 200 via the Internet 500. Further, the guide terminal 200 includes the interest analysis unit 221 that analyzes interest information received from the participant terminal 300. The interest of the participant P that has been analyzed is displayed on the display panel 201. The display panel 201 also serves as an interest output unit that outputs interest of the participant P.

Figure 2:
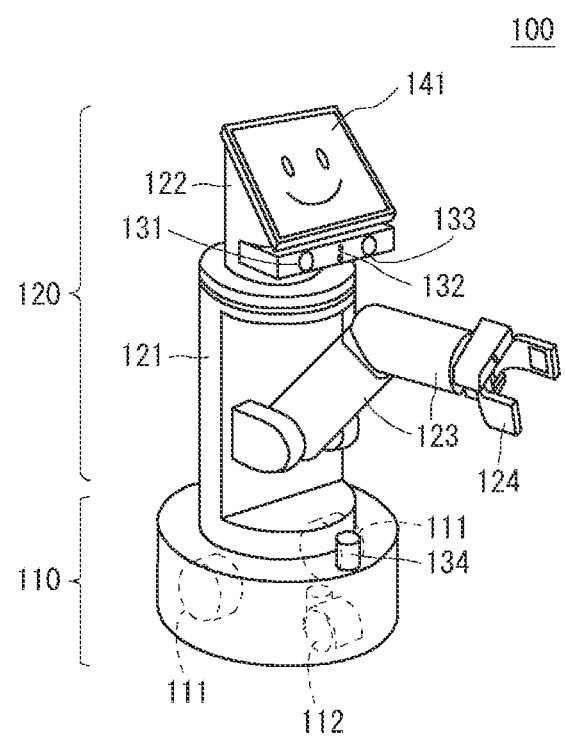
FIG. 2 is an external perspective view showing an external configuration example of a robot according to the first embodiment.

FIG. 2 is an external perspective view showing an example of an external configuration of the robot 100 according to this embodiment. As shown in FIG. 2, the robot 100 according to this embodiment mainly includes a movable base part 110 and a main-body part 120.

The movable base part 110 supports two driving wheels 111 and a caster 112, each of which is in contact with a traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110.

Further, the movable base part 110 includes a laser scanner 134 in a peripheral part of its top surface. The laser scanner 134 scans a certain range on the horizontal plane at intervals of a certain stepping angle and outputs information as to whether or not there is an obstacle in each direction. Further, when there is an obstacle, the laser scanner 134 outputs a distance to the obstacle.

The main-body part 120 includes, mainly, a body part 121 mounted on the top surface of the movable base part 110, a head part 122 placed on the top surface of the body part 121, an arm 123 supported on the side surface of the body part 121, and the hand 124 disposed at the tip of the arm 123. The arm 123 and the hand 124 are driven by motors (not shown)

and grasp an object to be grasped. The body part 121 is able to rotate around a vertical axis with respect to the movable base part 110 by a driving force of a motor (not shown).

The head part 122 mainly includes the camera 131, the microphone 132, a speaker 133, and a display panel 141. The camera 131 is disposed, for example, on the front surface of the head part 122 in such a way that the front direction of the head part 122 is an imaging direction. The camera 131 may either be a two-dimensional camera or a stereo camera. When, for example, the camera 131 is a stereo camera, this camera 131 has a configuration in which two camera units having the same angle of view are arranged away from each other, and it outputs imaging signals taken by the respective camera units.

The microphone 132 is disposed, for example, on the front surface of the head part 122 in such a way that the front direction of the head part 122 is a collect direction. The microphone 132 may either be a unidirectional microphone or a non-directional microphone. The speaker 133 is disposed, for example, in front or side of the head part 122 in such a way that the front direction of the head part 122 is an output direction. The speaker 133 may either be a monaural speaker or a stereo speaker.

The display panel 141 is disposed on the front surface of the head part 122 in such a way that the front direction of the head part is a display direction. The display panel 141 is, for example, a liquid crystal panel, and displays an animated face of a pre-defined character and displays information about the robot 100 in the form of text or by using icons. By displaying the face of the character on the display panel 141, it is possible to impart an impression that the display panel 141 is a pseudo face part to people around the robot 100. The display panel 141 is able to display images of the guide G and the participants P received from the guide terminal 200 and the participant terminals 300.

The head part 122 is able to rotate around a vertical axis with respect to the body part 121 by a driving force of a motor (not shown). Thus, the camera 131 can shoot an image in any direction, the microphone 132 can collect a sound in any direction, the speaker 133 can output a sound in any direction, and the display panel 141 can show the displayed content in any direction.

Figure 3:
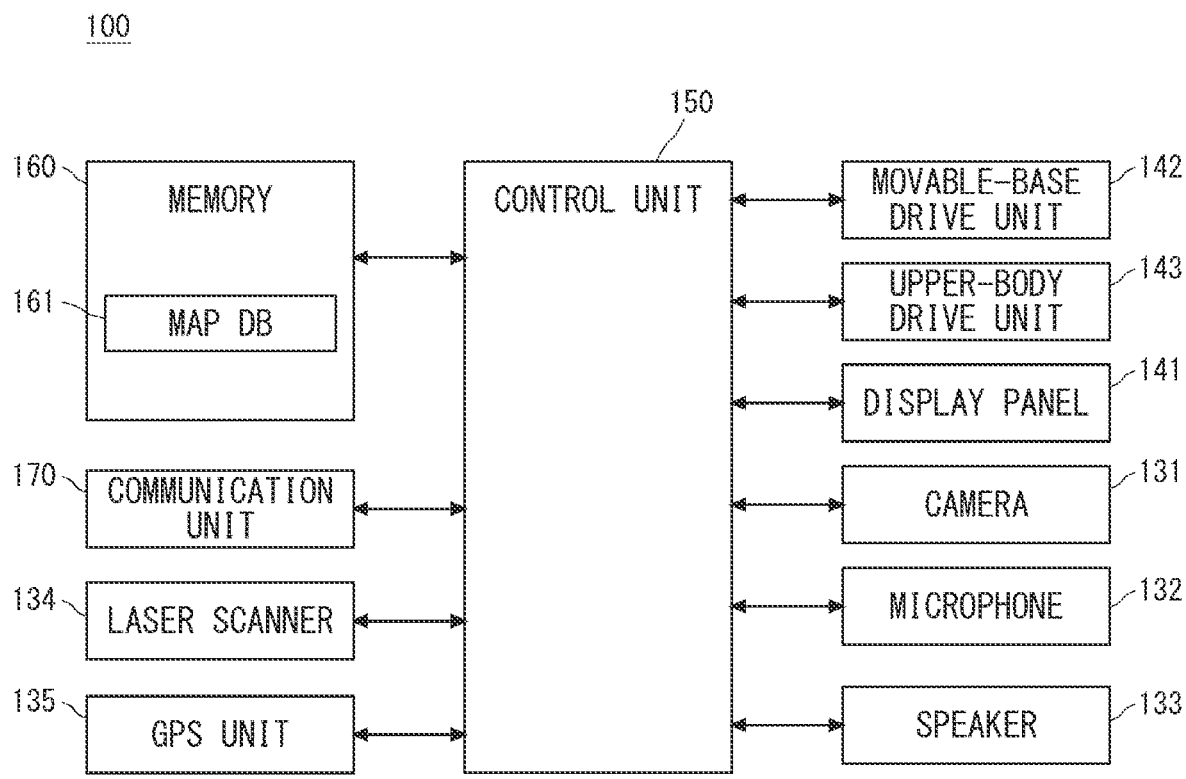
FIG. 3 is a block diagram showing a functional configuration example of the robot according to the first embodiment.

FIG. 3 is a block diagram showing a functional configuration example of the robot 100 according to this embodiment. As shown in FIG. 3, the robot 100 includes, as functional blocks, besides the display panel 141, the camera 131, the microphone 132, the speaker 133, and the laser scanner 134 described above, a control unit 150, a movable-base drive unit 142, an upper-body drive unit 143, a memory 160, a communication unit 170, and a GPS unit 135.

Main elements related to the remote operation and the remote communication by the guide terminal 200 and the participant terminals 300 will be described. However, the robot 100 may include elements in its configuration other than the above ones and may include additional elements that contribute to the remote operation and the remote communication.

The control unit 150, which is, for example, a Central Processing Unit (CPU), executes control of the whole robot 100 and various calculation processes by executing a control program read from the memory 160. Further, the control unit 150 also serves as a function execution unit that executes various calculations and controls related to the control.

The control unit 150 is included in, for example, a control unit disposed in the body part 121. The movable-base drive unit 142 includes the driving wheels 111, and a driving circuit and motors for driving the driving wheels 111. The control unit 150 executes rotation control of the driving wheels by sending a driving signal to the movable-base drive unit 142. Further, the control unit 150 receives a feedback signal such as an encoder signal from the movable-base drive unit 142 and recognizes a moving direction and a moving speed of the movable base part 110.

The upper-body drive unit 143 includes the arm 123 and the hand 124, the body part 121, the head part 122, and driving circuits and motors for driving these components. The control unit 150 performs a grasping motion and a gesture by sending a driving signal to the upper-body drive unit 143. Further, the control unit 150 receives a feedback signal such as an encoder signal from the upper-body drive unit 143 and recognizes positions and moving speeds of the arm 123 and the hand 124, and orientations and rotation speeds of the body part 121 and the head part 122.

The display panel 141 receives an image signal generated by the control unit 150 and displays an image thereof. The control unit 150 generates an image signal of the character or the like based on information in the memory 160, received information or the like and causes the display panel 141 to display an image thereof. When, for example, the display panel 141 includes a touch panel, the display panel 141 outputs a touch signal to the control unit 150.

The camera 131 shoots, for example, the front part of the robot 100 in accordance with a request from the control unit 150 and outputs an imaging signal generated by imaging to the output unit 150. The control unit 150 executes image processing using the imaging signal from the camera 131 and converts the imaging signal into a captured image in accordance with a predetermined format.

The microphone 132 collects voices emitted near the robot 100 in accordance with a request from the control unit 150, and outputs a voice signal generated by sound collection to the control unit 150. The control unit 150 performs voice processing by using the voice signal from the microphone 132 and converts the imaging signal in accordance with a predetermined format.

The speaker 133 outputs, for example, voices sent from the guide terminal 200 and the participant terminals 300. The control unit 150 outputs voice signals received from the guide terminal 200 and the participant terminals 300 to the speaker 133 via the communication unit 170, and the speaker 133 outputs the voice signals from the control unit 150 to the surroundings.

The laser scanner 134 detects whether there is an obstacle in the moving direction of the robot 100 in accordance with a request from the control unit 150, and outputs a detection signal, which indicates the results of the detection, to the control unit 150. The GPS unit 135 detects the position of the robot 100 based on a GPS signal received from a Global Positioning System (GPS) satellite in accordance with a request from the control unit 150, and outputs a positional signal (positional information), which is the result of the detection, to the control unit 150. The position of the robot 100 may be detected by a method other than the GPS.

The memory 160, which is a non-volatile storage medium, is, for example, a solid-state drive. The memory 160 stores, besides a control program for controlling the robot 100, various parameter values, functions, lookup tables and the like used for the control and the calculation. The memory 160 stores, for example, a map DB 161, which is a database of map information that describes the space of the first environment where the robot 100 is planned to autonomously move. In the map DB 161, target map information which has been acquired from, for example, the system server 400 according to the range in which the robot 100 moves is accumulated.

The communication unit 170, which is, for example, a wireless LAN unit, performs radio communication with the wireless router 600. The communication unit 170 transmits or receives control signals, data or the like to or from the guide terminal 200 and the participant terminals 300 via the wireless router 600. For example, the communication unit 170 receives a designation signal and an operation instruction sent from the guide terminal 200 and outputs the designation signal or the operation instruction to the control unit 150. The designation signal is a signal for requesting the captured image or the voice signal generated in the guide terminal 200 by designating a spatial area that the user wants to observe. Further, the communication unit 170 transmits captured images acquired by the camera 131 and voices acquired by the microphone 132 to the guide terminal 200 and the participant terminals 300 in accordance with control by the control unit 150. The communication unit 170 may transmit positional information detected by the GPS unit 135 to the guide terminal 200 and the participant terminals 300 and transmit map information accumulated in the map DB 161 to the guide terminal 200 and the participant terminals 300. The communication unit 170 further receives images or voices sent from the guide terminal 200 and the participant terminals 300 and outputs these images or voices to the control unit 150.

Figure 4:
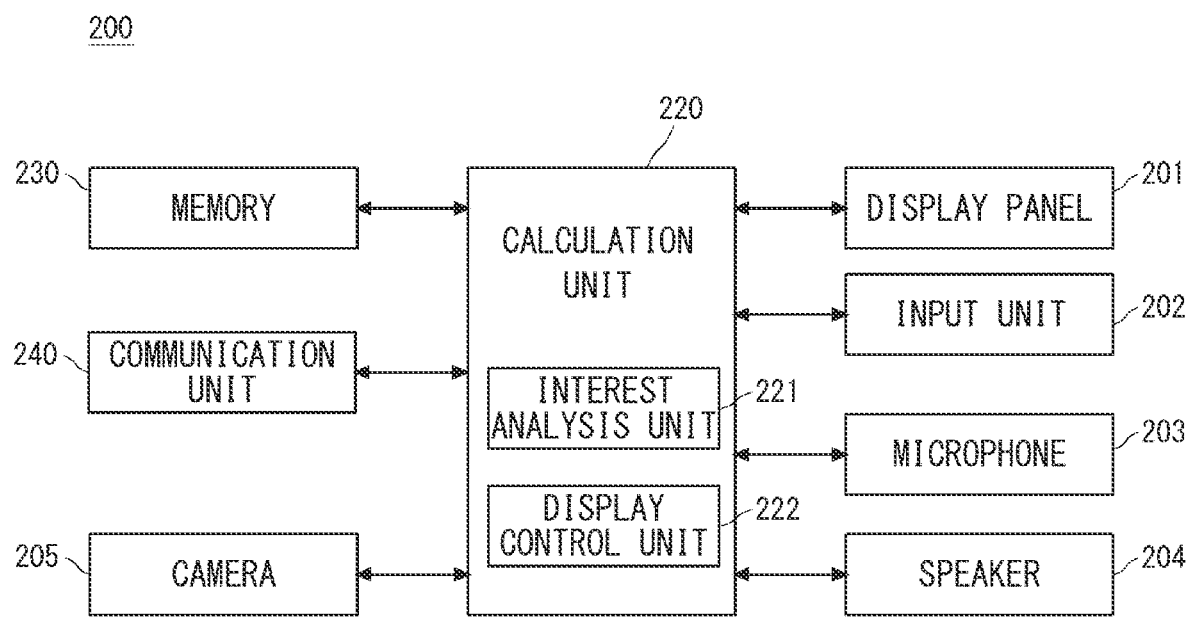
FIG. 4 is a block diagram showing a functional configuration example of a guide terminal according to the first embodiment.

FIG. 4 is a block diagram showing a functional configuration example of the guide terminal 200 according to this embodiment. As shown in FIG. 4, the guide terminal 200 includes, as functional blocks, a calculation unit 220, the display panel 201, an input unit 202, a microphone 203, a speaker 204, a camera 205, a memory 230, and a communication unit 240.

Main elements related to the remote operation of the robot 100 or the remote communication with the robot 100 and the participant terminals 300 will be described. However, the guide terminal 200 may include elements in its configuration other than the above one and may include additional elements that contribute to the processing for performing remote operation and remote communication.

The calculation unit (control unit) 220, which is, for example, a CPU, executes control of the whole guide terminal 200 and various calculation processes by executing a control program read from the memory 230. The display panel 201, which is, for example, a liquid crystal panel, displays, for example, a captured image or map information sent from the robot 100 and/or the participant terminal 300 and images captured by the camera 205.

The input unit 202 includes a touch panel disposed so as to be superimposed on the display panel 201 and a push button provided on a peripheral part of the display panel 201. The input unit 202 generates an operation signal in response to an operation performed by the guide G, and outputs the generated operation signal to the calculation unit 220.

The microphone 203 collects voices emitted near the guide terminal 200 in accordance with a request from the calculation unit 220, and outputs the voice signal generated by voice collection to the calculation unit 220. The speaker 204 outputs, for example, voices sent from the robot 100 and/or the participant terminal 300. The camera 205 captures images of, for example, the guide G who is in front of the guide terminal 200 (in front of the display panel 201) in accordance with a request from the calculation unit 220, and outputs the imaging signal generated by imaging to the calculation unit 220.

The memory 230, which is a non-volatile storage medium, may be, for example, a solid-state drive. The memory 230 stores, besides a control program for controlling the guide terminal 200, various parameter values, functions, lookup tables, and the like used for the control and the calculation.

The communication unit 240, which is, for example, a wireless LAN unit, performs radio communication with the wireless router 600. The communication unit 240 transmits or receives control signals, data or the like to or from the robot 100 and/or the participant terminals 300 via the wireless router 600. For example, the communication unit 240 receives captured images or voice signals sent from the robot 100 and/or the participant terminal 300, map information, or the like and outputs the received data to the calculation unit 220. Further, the communication unit 240 cooperates with the calculation unit 220 and transmits designation signals, operation signals, captured images, voice signals or the like to the robot 100 and/or the participant terminal 300.

The calculation unit 220 also serves as a functional calculation unit that executes various processes and calculation. The calculation unit 220 includes, for example, an interest analysis unit 221 and a display control unit 222. The interest analysis unit 221 analyzes interest of participants P based on interest information sent from the participant terminals 300. The display control unit 222 displays, for example, the result of analyzing interest of the participants P on the display panel 201. The display control unit 222 displays information indicating the interest of the participants P superimposed on the captured image etc. displayed on the display panel 201. It can also be said that the display control unit 222 and the display panel 201, which cooperate with each other, configure an output unit that outputs the interest.

Figure 5:
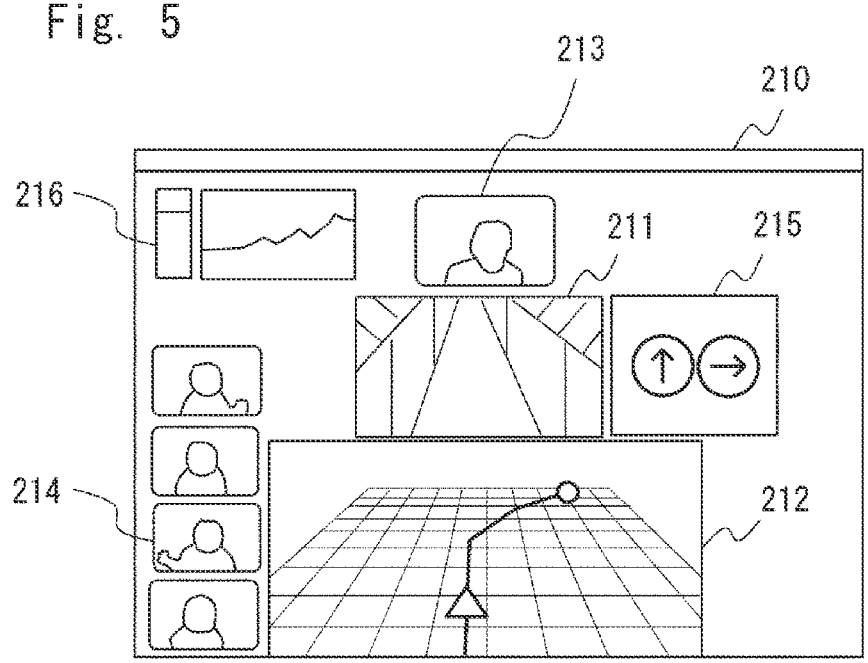
FIG. 5 is an image view showing a configuration example of a display screen of the guide terminal according to the first embodiment.

FIG. 5 shows a configuration example of the guide screen 210 displayed on the display panel 201 of the guide terminal 200 according to this embodiment. As shown in FIG. 5, for example, the guide screen 210 includes a robot image display area 211, a map display area 212, a guide image display area 213, a participant image display area 214, a manipulation panel display area 215, and an interest display area 216. Note that the display form of each area shown in FIG. 5 is merely one example, and is not limited thereto.

The robot image display area 211 displays captured images around the robot 100 that have been captured and transmitted by the robot 100. Further, the robot image display area 211 displays, for example, a heat map in accordance with the interest of the participants P in such a way that the heat map is superimposed on an image captured by the robot 100.

The map display area 212 displays map information and positional information near the robot 100 transmitted by the robot 100. The map display area 212 displays, for example, information on, for example, a tourist spot near the robot 100, the current location, the moving path, the destination, and the orientation of the robot 100, and the like.

The guide image display area 213 displays images (guide images) that have been captured by the camera 205 and mainly includes the face of the guide G (manipulator). The participant image display area 214 displays captured images (participant images) that have been captured and transmitted by the plurality of participant terminals 300 and mainly include the faces of the plurality of participants P.

The manipulation panel display area 215 displays a manipulation panel for manipulating (remotely operating) the robot 100. The manipulation panel includes a button or the like for adjusting the moving direction or the moving speed of the robot 100, the orientation of the camera and the like.

The interest display area 216 displays information regarding the interest of the participants P. The interest display area 216 displays, for example, a level meter indicating the level of interest and a graph indicating a temporal change of interest.

Figure 6:
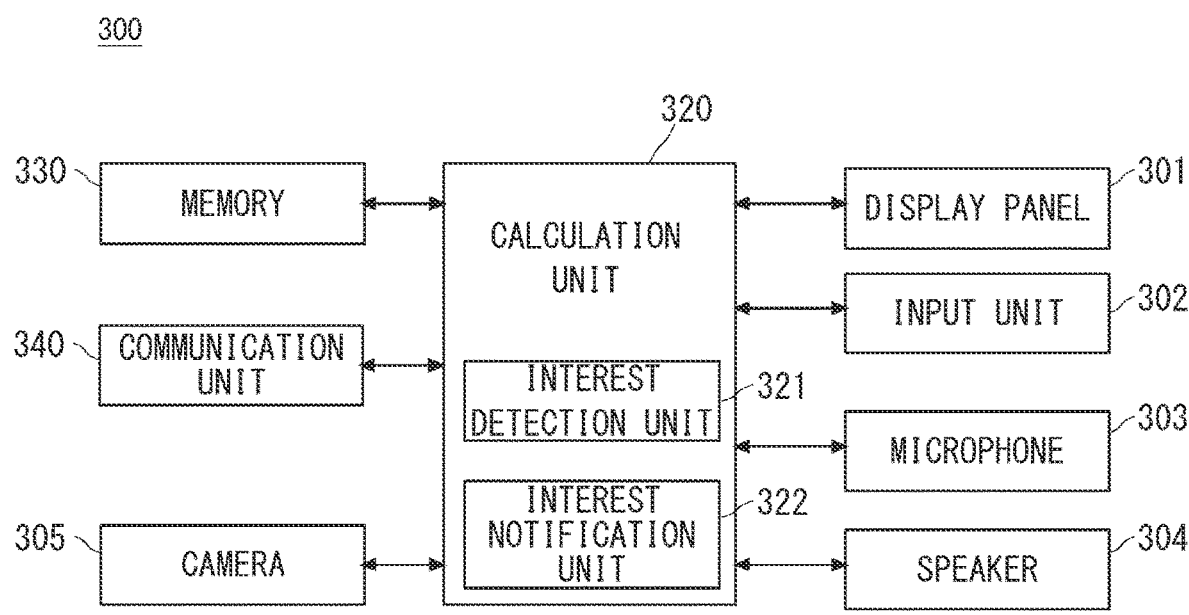
FIG. 6 is a block diagram showing a functional configuration example of a participant terminal according to the first embodiment.

FIG. 6 is a block diagram showing a block configuration example of the participant terminal 300 according to this embodiment. As shown in FIG. 6, the participant terminal 300 includes, as functional blocks, a calculation unit 320, the display panel 301, an input unit 302, a microphone 303, a speaker 304, a camera 305, a memory 330, and a communication unit 340.

Main elements related to the remote communication with the robot 100, the guide terminal 200, and other participant terminals 300 will be described below. However, the participant terminal 300 may include elements in its configuration other than the above ones and may include additional elements that contribute to the processing for performing remote communication.

The calculation unit (control unit) 320 is, for example, a CPU, and executes control of the whole participant terminal 300 and various calculation processes by executing a control program loaded from the memory 330. The display panel 301 is, for example, a liquid crystal panel, and displays, for example, captured images sent from the robot 100, the guide terminal 200, or other participant terminals 300, map information, and images captured by the camera 305.

The input unit 302 includes a touch panel disposed so as to be superimposed on the display panel 301 and a push button provided on a peripheral part of the display panel 301. The input unit 302 generates an operation signal in response to an operation by the participant P and outputs the operation signal to the calculation unit 320.

The microphone 303 collects voices emitted near the participant terminal 300 in accordance with a request from the calculation unit 320, and outputs the voice signal generated by voice sound collection to the calculation unit 320. The speaker 304 outputs, for example, voices sent from the robot 100, the guide terminal 200, and other participant terminals 300. The camera 305 captures images of, for example, a participant P who is in front of the participant terminal 300 (in front of the display panel 301) in accordance with a request from the calculation unit 320, and outputs the imaging signal generated by imaging to the calculation unit 320.

The memory 330, which is a non-volatile storage medium, may be, for example, a solid-state drive. The memory 330 stores, besides a control program for controlling the participant terminal 300, various parameter values, functions, lookup tables and the like used for the control and the calculation.

The communication unit 340, which is, for example, a wireless LAN unit, performs radio communication with the wireless router 600. The communication unit 340 transmits or receives control signals, data or the like to or from the robot 100, the guide terminal 200, and other participant terminals 300 via the wireless router 600. The communication unit 340 receives, for example, captured images or voice signals sent from the robot 100, the guide terminal 200, and the other participant terminals 300, or the map information, and outputs the received data to the calculation unit 320. Further, the communication unit 340, which cooperates with the calculation unit 320, transmits the captured images, the voice signals and the like to the guide terminal 200 and the other participant terminals 300.

The calculation unit 320 also serves as a functional calculation unit that executes various processes and calculation. For example, the calculation unit 320 includes an interest detection unit 321 and an interest notification unit 322. The interest detection unit 321 detects the interest of a participant P in accordance with an input operation or the like performed by the participant P. The interest notification unit 322 notifies the guide terminal 200 of the interest information indicating the detected interest via the communication unit 340.

Figure 7:
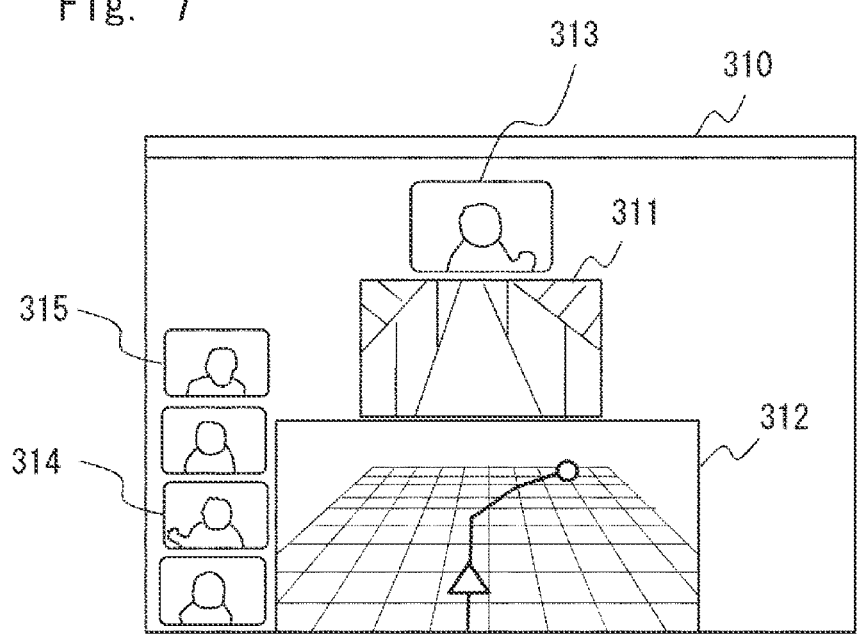
FIG. 7 is an image view showing a configuration example of a display screen of the participant terminal according to the first embodiment.

FIG. 7 shows a configuration example of a participant screen 310 displayed on the display panel 301 of the participant terminal 300 according to this embodiment. As shown in FIG. 7, the participant screen 310 includes, for example, a robot image display area 311, a map display area 312, an own participant image display area 313, an other participant image display area 314, and a guide image display area 315. Note that the display form in each area shown in FIG. 7 is merely one example, and is not limited to them.

The robot image display area 311 displays captured images near the robot 100 that have been captured and transmitted by the robot 100. The map display area 312 displays the map information and the positional information near the robot 100 that have been transmitted from the robot 100. The map display area 312 displays, for example, information on, for example, a tourist spot near the robot 100, the current location, the moving path, the destination, the orientation of the robot 100 and the like.

The own participant image display area 313 displays an image (an own participant image) that has been captured by the camera 305 and mainly includes the face of the own participant P who operates the participant terminal 300. The other participant image display area 314 displays images (other participant images) that have been captured and transmitted by the other participant terminals 300 and mainly include the faces of the other participants P who operate the other participant terminals 300. The guide image display area 315 displays an image (a guide image) that has been captured and transmitted by the guide terminal 200 and mainly includes the face of the guide G.

Figure 8:
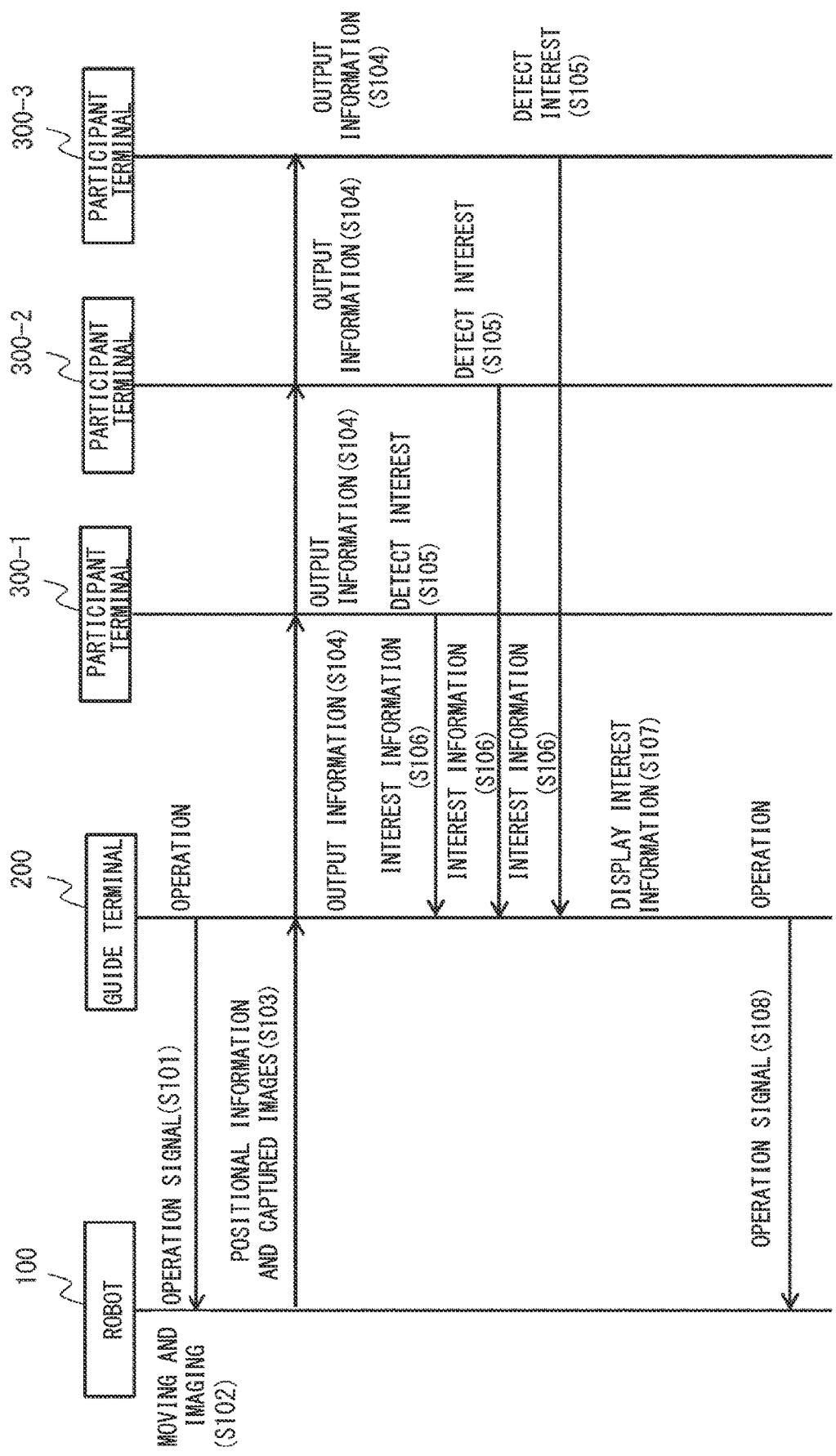
FIG. 8 is a sequence diagram showing an operation example of a remote robot system according to the first embodiment.

FIG. 8 shows an operation example of the remote robot system 10 according to this embodiment. As shown in FIG. 8, the guide terminal 200 transmits an operation signal for remotely operating the robot 100 to the robot 100 in accordance with the operation by the guide G (S101). In the guide terminal 200, when the guide G operates the manipulation panel displayed in the manipulation panel display area 215 of the guide screen 210, the calculation unit 220 generates an operation signal indicating control of moving, imaging, etc. in accordance with the operation by the guide G, and transmits the operation signal to the robot 100 via the communication unit 240.

Next, the robot 100 performs a moving operation and an imaging operation in accordance with the operation signal (S102) and transmits the positional information and the captured images to the guide terminal 200 and the plurality of participant terminals 300 (S103). In the robot 100, after the communication unit 170 receives the operation signal from the guide terminal 200, the control unit 150 controls driving of the movable-base drive unit 142 and the upper-body drive unit 143 in accordance with the operation signal that has been received, and controls an imaging operation and the like of the camera 131. The control unit 150 transmits the images captured by the camera 131 and the positional information (e.g., the latitude and the longitude) detected by the GPS unit 135 to the guide terminal 200 and the plurality of participant terminals 300 via the communication unit 170. Further, the control unit 150 transmits map information, voices and the like near the robot 100 to the guide terminal 200 and the plurality of participant terminals 300 as necessary.

Note that the positional information and the captured images may be transmitted from the robot 100 to the guide terminal 200 and each of the plurality of participant terminals 300, or the positional information and the captured images may be transmitted from the robot 100 to the guide terminal 200 and further forwarded from the guide terminal 200 to the plurality of participant terminals 300.

Next, the guide terminal 200 and the plurality of participant terminals 300 output the information received from the robot 100 (S104). In the guide terminal 200, when the communication unit 240 receives the positional information and the captured images from the robot 100, the calculation unit 220 (the display control unit 222) causes the robot image display area 211 of the guide screen 210 to display the received images captured by the robot 100, and causes the map display area 212 to display positional information of the robot 100 that has been received. Further, when the guide terminal 200 has received map information from the robot 100, the guide terminal 200 updates the map information in the map display area 212. When the guide terminal 200 has received a voice signal, the guide terminal 200 causes the speaker 204 to output the voice.

Like in the guide terminal 200, in the participant terminal 300, when the communication unit 340 receives the positional information and the captured images from the robot 100, the calculation unit 320 causes the robot image display area 311 of the participant screen 310 to display the received images captured by the robot 100, and causes the map display area 312 to display positional information of the robot 100 that has been received. Further, when the participant terminal 300 has received map information from the robot 100, the participant terminal 300 updates the map information in the map display area 312. When the participant terminal 300 has received a voice signal, the participant terminal 300 causes the speaker 304 to output the voice.

Next, the plurality of participant terminals 300 detect the interest of each of the participants P in accordance with, for example, the operation by each participant P (S105), and transmits interest information indicating the interest that has been detected to the guide terminal 200 (S106). The interest detection unit 321 of the participant terminal 300 detects the interest of a participant P based on, for example, an operation state, an utterance state, an operation attention or the like of the participant P. The interest detection unit 321 of the participant terminal 300 may detect the interest of the participant P based on, for example, one of the operation state, the utterance state, the attention state and the like or based on any given states. After the interest detection unit 321 detects interest, the interest notification unit 322 transmits information on the interest (each state) that have been detected to the guide terminal 200 via the communication unit 340.

For example, the interest detection unit 321 detects the operation state of the participant P in response to the display (output) of the participant screen 310, and detects the interest of the participant P based on the operation state that has been detected. For example, the interest notification unit 322 may transmit interest information including the operation state that has been detected. The operation state to be detected includes operation elements such as an operation position, the number of times of operations, an operation time and the like in the operation by the participant P on the participant screen 310 that displays information on the robot 100. One of the operation elements or any given operation elements may be used. The operation to be detected may be a touch operation on the touch panel of the display panel 301 or may be a mouse pointer movement or a clicking operation by a mouse operation.

When the operation position is detected, a specific position operated on the participant screen 310 may be detected, or a predetermined area including the operated position may be detected. For example, the participant screen 310 may be divided into some areas and a divided area including the operated position may be detected. The interest detection unit 321 detects the position or the area operated in the robot image display area 311 or the map display area 312.

Further, when the number of times of operations is detected, the number of touches or the number of mouse clicks or the like in a predetermined period may be detected. When the operation time is detected, a touch duration time (long press time), a click duration time or the like may be detected. When, for example, the number of touches is larger or the touch duration time is longer than a predetermined threshold in a predetermined area, the interest detection unit 321 may detect that this area is of great interest (that the participant is excited) and transmit information indicating that the area of great interest has been detected.

Further, the interest detection unit 321 detects the utterance state of a participant P in response to a display on the participant screen 310, and detects the interest of the participant P based on the utterance state that has been detected. The interest notification unit 322 may transmit interest information including the utterance state that has been detected. The utterance state to be detected includes utterance elements such as a sound pressure of the voice emitted by the participant P, an utterance time, and results of recognizing the voice (keyword). One of the utterance elements may be used or any given utterance elements may be used.

The interest detection unit 321 detects, for example, the sound pressure of the voice of a participant P by the microphone 303. Then, the interest detection unit 321 may detect that the participant P is excited by detecting phrases like "Wow!" or "Terrific!". When the utterance time is detected, a time during which a predetermined sound pressure continues may be detected. For example, the interest detection unit 321 may detect that the level of interest of the participant P has been increasing when the sound pressure of the participant P is larger than a predetermined threshold or a predetermined sound pressure continues for a predetermined period of time.

Further, the interest detection unit 321 may detect a predetermined voice by voice recognition. For example, voice recognition may be performed on a voice of a participant P detected by the microphone 303. When the interest detection unit 321 has recognized predetermined phrases like "Wow!" or "Terrific!", which indicate that the participant P is excited, the interest detection unit 321 may detect that the level of interest of the participant P has been increasing. In some embodiments, a predetermined keyword related to interest is recognized. This keyword may be the name of a building which is located near the robot 100 or a keyword related to the tourist spot. Further, the words to be detected regarding the interest (indicating that the participant is excited) may be negative keywords, not positive keywords. When the participant terminal 300 performs remote communication, the utterance state for the interest may be detected in a state in which the remote communication audio is muted.

Further, the interest detection unit 321 may detect the attention state of a participant P in response to a display on the participant screen 310, and detect the interest of the participant P based on the attention state that has been detected. The interest notification unit 322 may transmit interest information including the attention state that has been detected. The attention state that has been detected includes attention elements such as the orientation of the face of the participant P, the orientation of the line of sight of the participant P, the attention position, and the attention time. One of the attention elements may be used or any given attention elements may be used.

The interest detection unit 321 detects, for example, the orientation of the face of a participant P by an image of the camera 305, or detects the orientation of the line of sight of the participant P by a line-of-sight sensor provided in the participant terminal 300. The interest detection unit 321 estimates the attention position (it may be an attention area) on the participant screen 310 from the orientation of the face of the participant P or the orientation of the line of sight of the participant P. When the attention time is detected, the interest detection unit 321 may detect time during which a predetermined orientation of the face, a predetermined orientation of the line of sight, or a predetermined attention position continues. The interest detection unit 321 may detect that the level of interest of the participant P in this position (orientation) has been increasing when, for example, the same orientation of face, the same orientation of the line of sight, or the same attention position continues for a predetermined period of time. Further, the interest detection unit 321 may detect, in addition to or in place of the orientation of the face of the participant P, facial expressions of the participant P by image recognition. For example, positive and negative facial expressions may be detected.

Next, the guide terminal 200 displays the interest information received from the plurality of participant terminals 300 (S107). In the guide terminal 200, when the communication unit 240 receives the interest information from the plurality of participant terminals 300, the interest analysis unit 221 analyzes the interest of the plurality of participants P based on the received interest information and the display control unit 222 displays the results of the analysis on the guide screen 210. The interest analysis unit 221 aggregates or statistically processes the operation state, the utterance state, the attention state or the like of a participant P, detects the part of the screen which the participant P is focusing on, or detects a situation in which the participant P is excited, and displays the results of the detection in such a way that the guide G can recognize them. The statistical processing includes processing of obtaining a total value, an average value, a median value, a maximum value, a minimum value or the like, and includes statistics for each position (area) of the screen or statistics for each time. For example, the position of the guide screen 200 that corresponds to the interest information may be highlighted or a temporal change of the interest information may be displayed on the guide screen 210 that displays information on the robot 100. As an example of highlighting the position, a heat map may be superimposed on the robot image display area 211 of the guide screen 210. Further, as an example of displaying the temporal change, a level meter or a graph may be displayed in the interest display area 216 of the guide screen 210. In some embodiments, they are displayed in an aspect in accordance with the degree (level) of interest indicated by the interest information. The degree of interest is, for example, a value obtained based on the number of times of operations or the operation time in the state of operation by a plurality of participants, the sound pressure or an utterance time in the utterance state, and an attention time in the attention state, and each element may be weighted. The results of statistics of all the participants may be collectively displayed or they may be displayed in such a manner that the results of statistics for each participant can be recognized. They may be displayed in such a way that the number of participants who show interest can be recognized.

Figure 9:
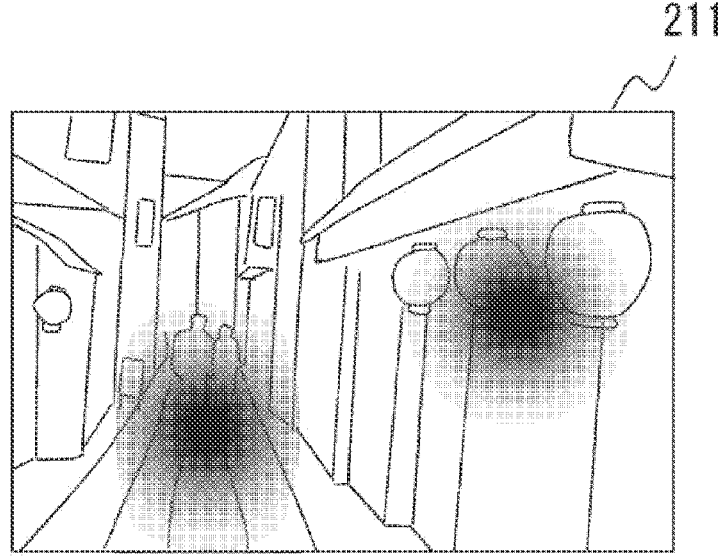
FIG. 9 is an image view showing an example of screen display of the guide terminal according to the first embodiment.

FIG. 9 is an example of displaying results of analyzing the interest information by a heat map. As shown in FIG. 9, the display control unit 222 displays, for example, the heat map in accordance with the interest information in the robot image display area 211 of the guide screen 210. The heat map may be displayed on the captured image in the robot image display area 211 or may be displayed on the map information in the map display area 212. Distribution of the interest is displayed in such a way that it is superimposed on parts of the captured image or the map information where the attention of the participant P is focused on (parts where the participant P who sees these parts is excited) so that the distribution can be visually recognized. For example, the area of great interest (interest is focused on) is displayed in red, and the heat map is displayed by using different shades and colors according to the level of attention (interest).

Figure 10:
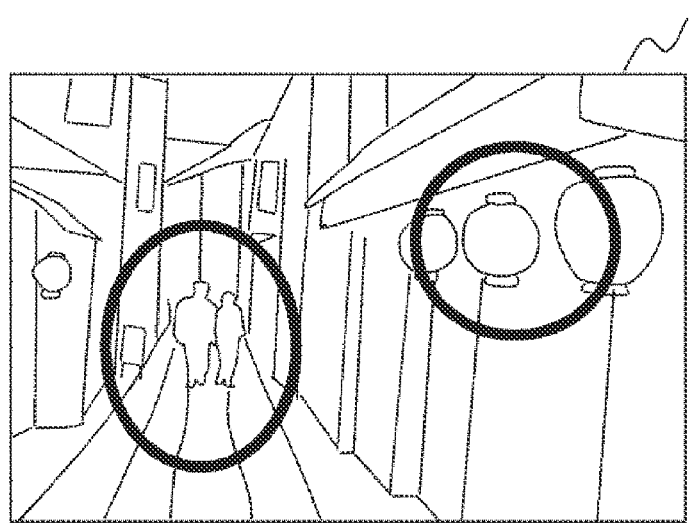
FIG. 10 is an image view showing an example of screen display of the guide terminal according to the first embodiment.

FIG. 10 is an example of displaying the results of analyzing the interest information by shapes such as circles. As shown in FIG. 10, the display control unit 222 causes, for example, the robot image display area 211 of the guide screen 210 to display circular frames in accordance with the interest information. The circular frame may be displayed on a captured image in the robot image display area 211 or may be displayed on the map information in the map display area 212. The circular frames are displayed so as to surround parts on the captured image or the map information where the attention of a participant P is focused on (parts where the participant P who sees these parts is excited). For example, an area of great interest (interest is focused on) is displayed by a red frame, and the frames are displayed by using different colors, sizes, or the thicknesses according to the level of attention (the level of interest). Note that the shape of the frames is not limited to circle and may be any other shape.

Figure 11A:
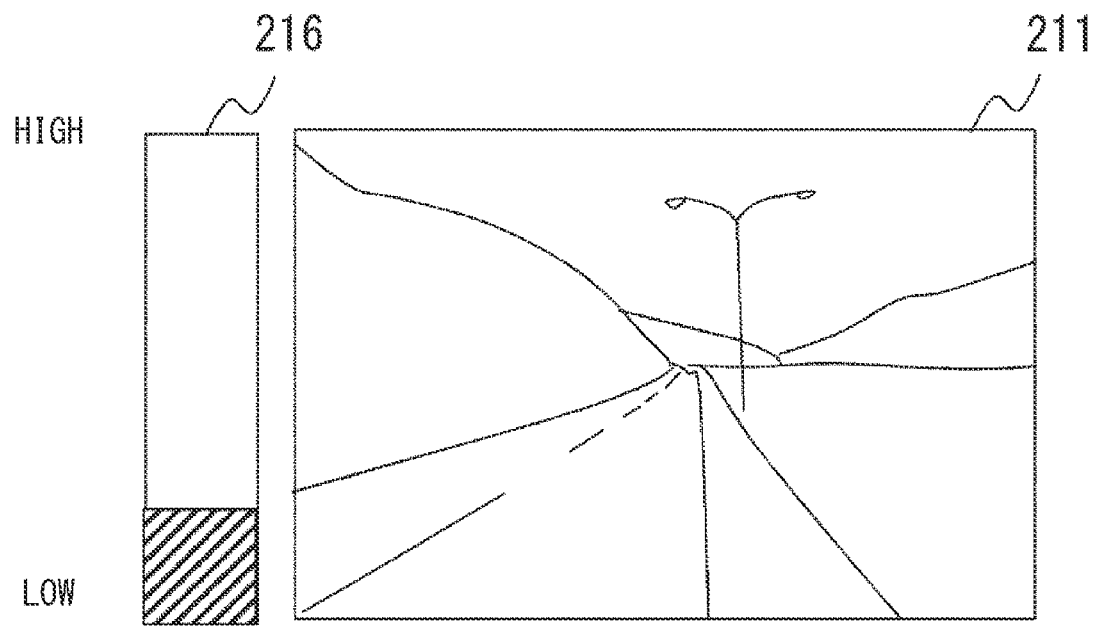
FIG. 11A is an image view showing an example of screen display of the guide terminal according to the first embodiment.
Figure 11B:
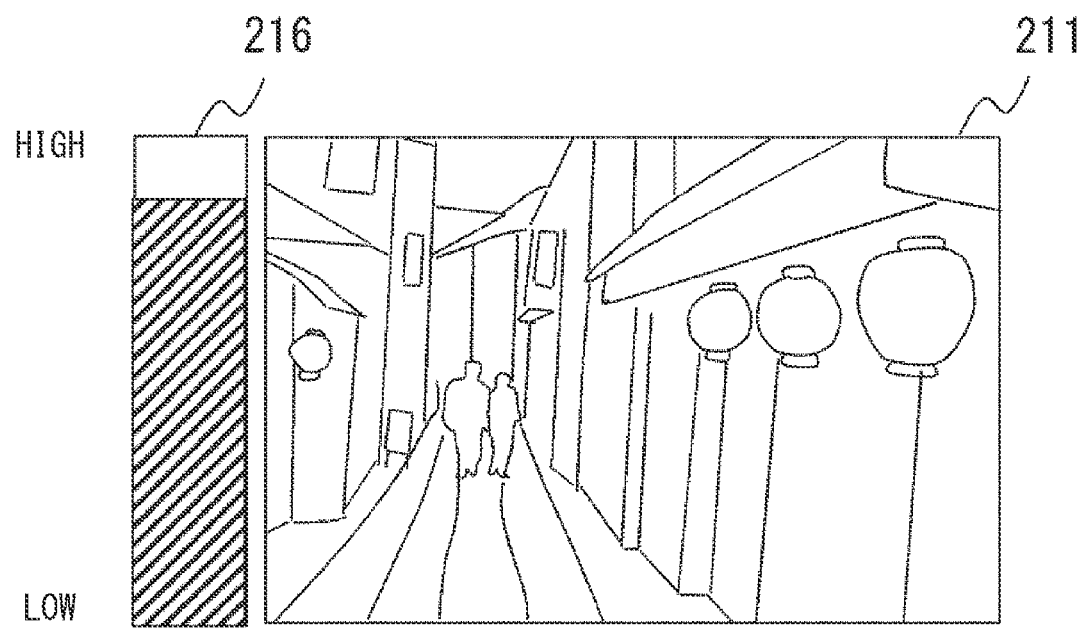
FIG. 11B is an image view showing an example of screen display of the guide terminal according to the first embodiment.

FIGS. 11A and 11B are examples of displaying the results of analyzing the interest information by a level meter. As shown in FIGS. 11A and 11B, the display control unit 222 displays, for example, the level meter of the level in accordance with the interest information in the interest display area 216 of the guide screen 210. The level meter displays the level (high/low) of the current interest (how excited a participant is). As shown in FIG. 11A, when the current interest level is low, the level meter shows a low level. As shown in FIG. 11B, when the current interest level is high, the level meter shows a high level. The level of the current interest may be displayed in the level meter in such a way that different levels are shown by different colors.

Figure 12:
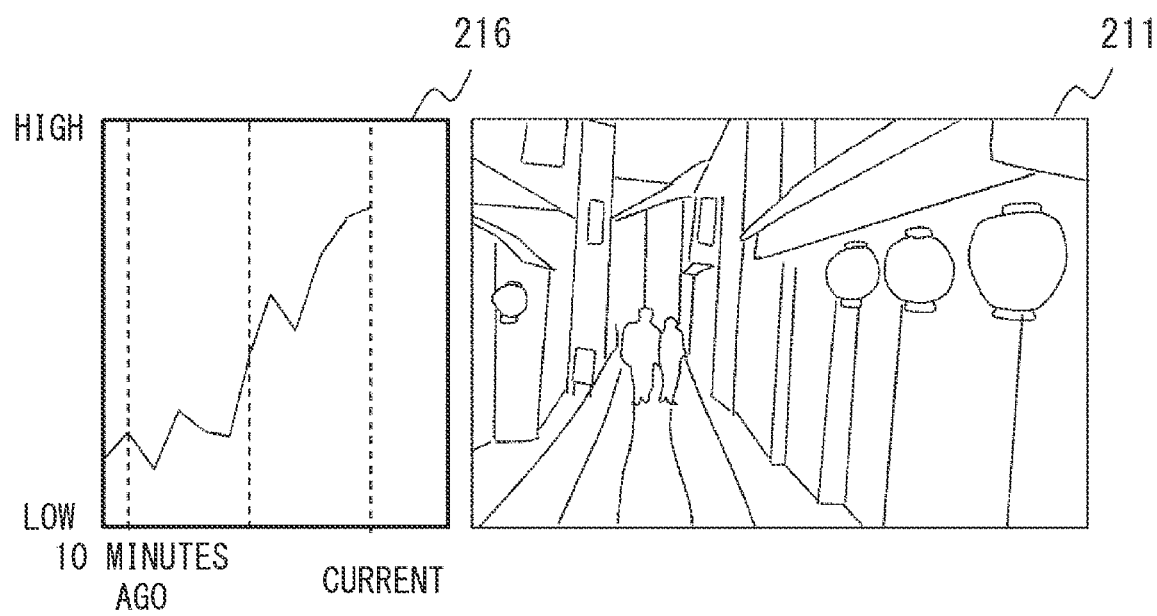
FIG. 12 is an image view showing an example of screen display of the guide terminal according to the first embodiment.

FIG. 12 is an example of displaying results of analyzing the interest information by a graph. As shown in FIG. 12, the display control unit 222 displays, for example, the graph showing the level of the current interest in accordance with the interest information in the interest display area 216 of the guide screen 210. The graph shows a temporal change regarding how excited a participant is. As shown in FIG. 12, the level of interest is displayed in a line graph in time order to display a relative change regarding how excited the participant is. The graph is not limited to a line graph and may be a bar graph or the like. The graph may be displayed by using different colors according to the level and temporal change.

As shown in FIG. 8, next, the guide terminal 200 transmits the operation signal for remotely operating the robot 100 to the robot 100 in accordance with the operation by the guide G, like in S101 (S108). The guide G knows the interest of the participant P from the interest information displayed on the guide screen 210 and operates the manipulation panel of the manipulation panel display area 215 of the guide screen 210 in such a way that the robot 100 moves, for example, toward the place of great interest. The calculation unit 220 generates an operation signal in accordance with the operation by the guide G, and transmits the operation signal to the robot 100 via the communication unit 240. After that, the robot 100 performs the moving operation, the imaging operation and the like in accordance with the operation signal, like in S102.

As described above, in this embodiment, a remote robot system that implements a remote sightseeing tour or the like includes a function of detecting interest of participants and a function of further presenting the detected results to the connection terminal of the guide. Accordingly, even when the guide and the participants are remotely away from each other, it is possible to send feedback information indicating which part the participants are focusing on and which part the participants are interested in to the guide. This enables the guide to explain the part the participants are interested in and enables to obtain detailed information by moving the robot. Accordingly, it is possible to provide a tour that meet the needs of participants while recognizing reactions of the participants (users), and thus respond appropriately according to participants.

Second Embodiment

Next, a second embodiment according to the present disclosure will be described. In this embodiment, an example of automatically controlling the operation of the robot in accordance with participants' interest in the remote robot system according to the first embodiment will be described.

Figure 13:
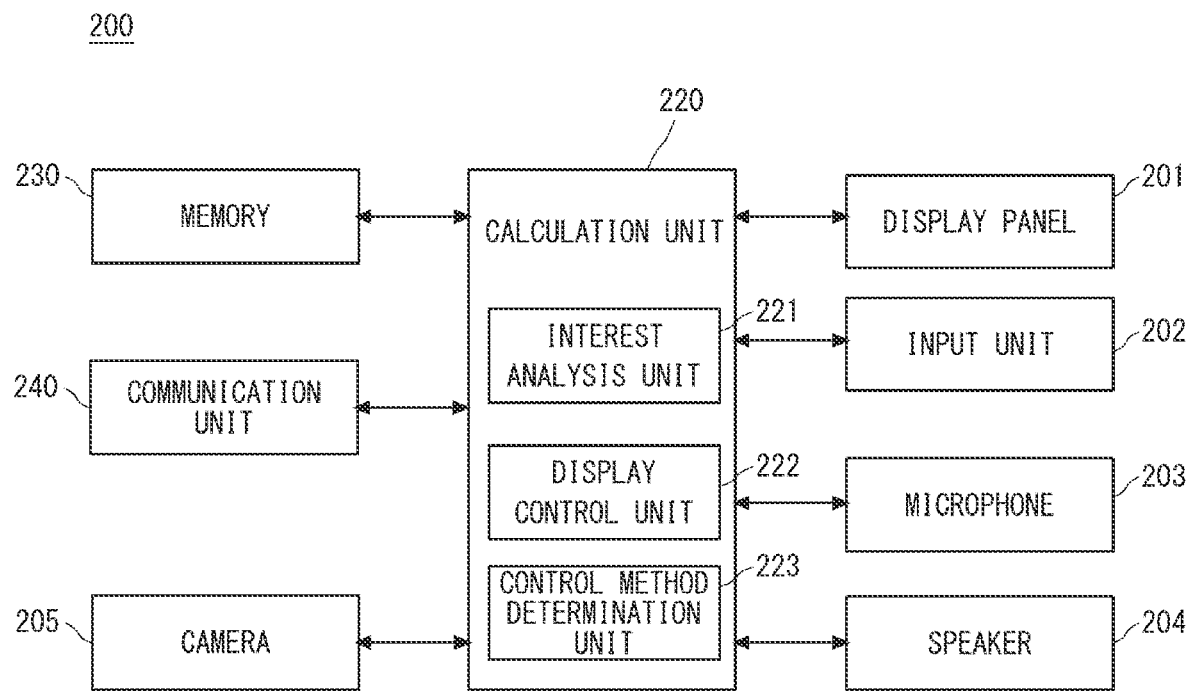
FIG. 13 is a block diagram showing a functional configuration example of a guide terminal according to a second embodiment.

FIG. 13 is a block diagram showing a functional configuration example of the guide terminal 200 according to this embodiment. As shown in FIG. 13, the guide terminal 200 includes a control method determination unit 223 in the calculation unit 220. The other configurations are similar to those in the first embodiment. The control method determination unit (remote control determination unit) 223 determines a method of controlling the robot 100 (remote operation method) based on interest information sent from the participant terminal 300, that is, in accordance with interest of a participant P analyzed by the interest analysis unit 221.

Figure 14:
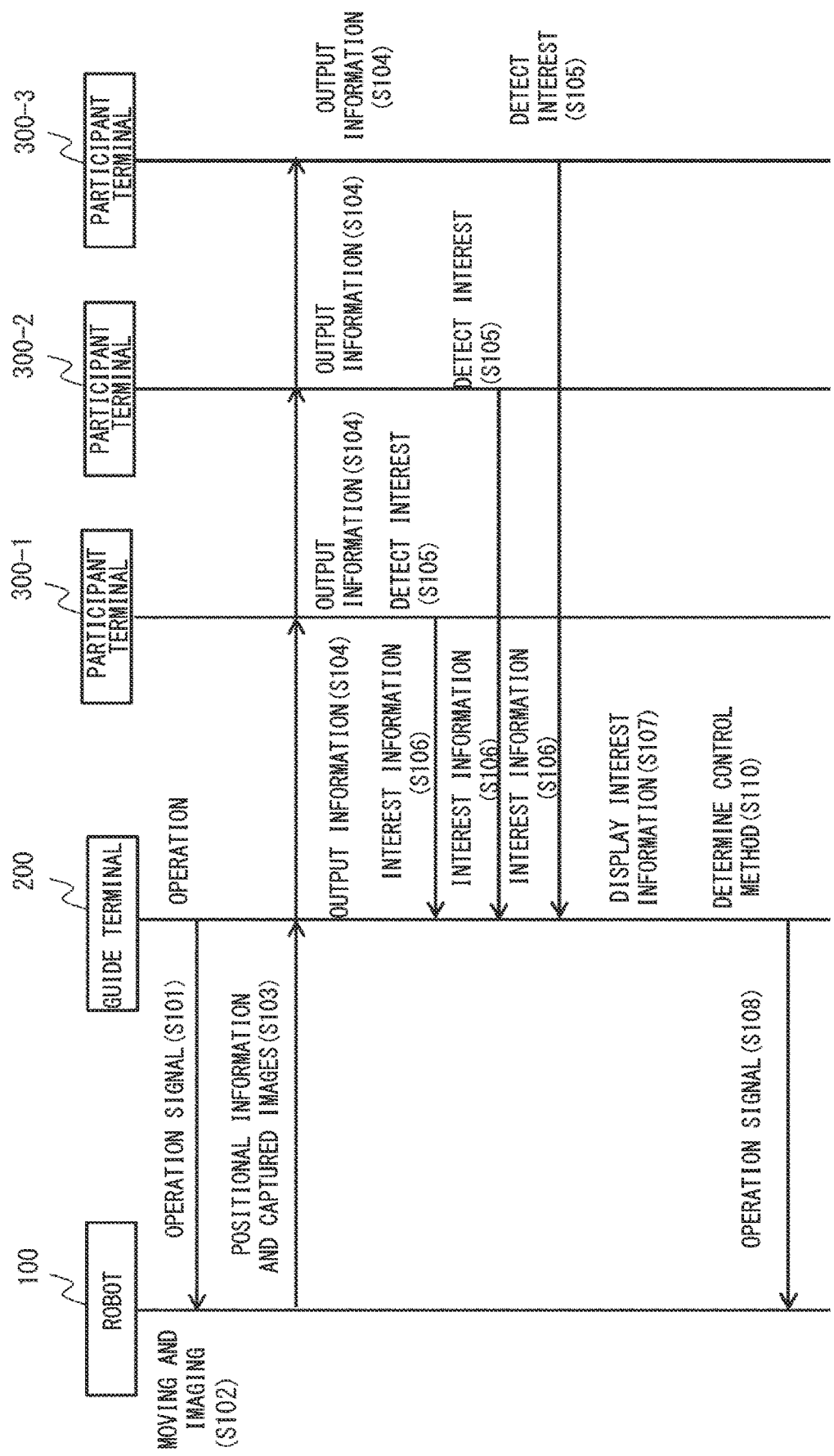
FIG. 14 is a sequence diagram showing an operation example of a remote robot system according to the second embodiment.

FIG. 14 shows an operation example of the remote robot system 10 according to this embodiment. In FIGS. 14, S101 to S107 are similar to those in the first embodiment. After S107, the guide terminal 200 determines the method of controlling the robot 100 in accordance with interest information of a participant P (S110), and transmits an operation signal of the control method that has been determined to the robot 100 (S108). When the interest analysis unit 221 analyzes interest information of the participant P and the display control unit 222 displays the results of the analysis, the control method determination unit 223 determines the method of controlling the robot 100 in accordance with the interest information of the participant P that has been analyzed. Note that the display of the interest information may be omitted and the control method may be determined in S110.

The control method determination unit 223 determines, for example, a moving method of the robot 100 including the moving direction, the moving path, the moving speed and the like of the robot 100. The control method determination unit 223 may automatically select a path of great interest from a plurality of tour paths in accordance with the interest information that has been analyzed. For example, when there are many participants P who are looking at a specific building, a path that passes near this building is selected. Further, the control method determination unit 223 may control the moving speed of the robot 100 in accordance with the interest information that has been analyzed. For example, the speed of the robot 100 may be adjusted depending on the magnitude of the degree of interest in such a way that the viewing time for areas of interest becomes longer and the viewing time for areas of less interest becomes shorter. The speed at which the robot 100 moves may be reduced or the robot 100 may stop moving in areas of interest.

Further, the control method determination unit 223 may determine an information acquisition method of the robot 100 including, for example, an imaging direction in which the robot 100 captures images or a voice collecting direction. The control method determination unit 223 may control the imaging direction of the camera 131 of the robot 100 in such a way that the camera 131 automatically faces the direction of interest in accordance with the interest information that has been analyzed, or may zoom in the imaging range of the camera 131. Likewise, the control method determination unit 223 may control the collection direction of the microphone 132 in such a way that the microphone 132 faces the direction of interest.

The robot 100 may be automatically controlled by transmitting an operation signal in accordance with the control method that has been determined or may display the control method that has been determined on the guide screen 210 to recommend the moving path and the like of the robot 100 to the guide G. Further, the determination of the control method and the execution of the control may not be performed by the guide terminal 200 and may be performed by another apparatus.

As described above, in this embodiment, the method of controlling the robot is determined in accordance with participant's interest in a remote robot system. Accordingly, the robot can be automatically controlled in accordance with the participant's interest, whereby it is possible to respond appropriately according to participants.

Note that the present disclosure is not limited to the above embodiments and may be changed as appropriate without departing from the spirit of the present disclosure. For example, while the example in which the remote robot system is used for a remote sightseeing tour has been described in the above embodiments, the remote robot system may be used for applications other than the remote sightseeing tour. This remote robot system may be used, for example, to remotely search for missing persons such as lost children or to remotely check the states of family members. The above embodiments can be efficiently used when multiple remote users remotely operate a robot and don't know where to focus on when remotely controlling the robot.

Each of the configurations in the above embodiments may be constructed by software, hardware, or both of them. Further, each of the configurations may be formed by one hardware device or one software program, or a plurality of hardware devices or a plurality of software programs. The function (the process) of each apparatus may be implemented by a computer including a CPU, a memory and the like. For example, a program for performing a method (control method) according to the embodiments may be stored in a storage device, and each function may be implemented by having the CPU execute the program stored in the storage device.

The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disc (DVD), Blu-ray (Registered Trademark) disc or other optical disc storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote robot system comprising:
   a robot configured to perform a predetermined operation including collection of local information near the robot;
   a first remote terminal configured to remotely operate the operation of the robot, generate an operation signal indicative of a moving operation and an imaging operation, and execute the moving operation and the imaging operation in accordance with the operation signal, the first remote terminal comprising a display panel; and
   a second remote terminal configured to remotely communicate with the first remote terminal, wherein
   the second remote terminal comprises:
   a display panel configured to output the local information acquired from the robot to a user;
   a central processing unit configured to detect user's interest in the output local information;
   the user associated with the second remote terminal experiences a sightseeing tour via the robot that is remotely operated by the first remote terminal;
   the central processing unit of the second remote terminal is configured to notify the first remote terminal of interest information indicating the detected interest;
   the display panel of the first remote terminal is configured to output the interest information that has been sent;
   the display panel of the first remote terminal highlights a position that corresponds to the interest information on a display screen that displays the local information; and
   the display panel of the first remote terminal is configured to superimpose a heat map on an image captured by the robot, the heat map being displayed in accordance with the user's interest.

2. The remote robot system according to claim 1, wherein the central processing unit detects an operation state by the user in response to the output local information and detects the user's interest based on the operation state that has been detected.

3. The remote robot system according to claim 2, wherein the operation state includes an operation position, the number of times of operations, or an operation time in the user's operation performed on the display screen that displays the local information.

4. The remote robot system according to claim 1, wherein the central processing unit detects an utterance state of the user in response to the output local information and detects the user's interest based on the utterance state that has been detected.

5. The remote robot system according to claim 4, wherein the utterance state includes a sound pressure of a voice emitted by the user, an utterance time of the voice, or results of recognizing the voice.

6. The remote robot system according to claim 1, wherein the central processing unit detects an attention state of the user in response to the output local information and detects the user's interest based on the attention state that has been detected.

7. The remote robot system according to claim 6, wherein the attention state includes the orientation of the face of the user, the orientation of the line of sight of the user, an attention position of the user, or an attention time of the user.

8. The remote robot system according to claim 1, wherein the display panel of the first remote terminal displays a temporal change of the interest information on the display screen that displays the local information.

9. The remote robot system according to claim 1, wherein the first remote terminal comprises a central processing unit configured to determine a method of remotely operating the robot based on the interest information that has been sent.

10. The remote robot system according to claim 9, wherein the central processing unit of the first remote terminal determines a method of moving the robot including a moving direction, a moving path, or a moving speed of the robot based on the interest information.

11. The remote robot system according to claim 9, wherein the central processing unit of the first remote terminal determines an information acquisition method of the robot including an imaging direction of the image of the robot or a voice collection direction based on the interest information.

12. A method of controlling a remote robot system comprising:
   a robot configured to perform a predetermined operation including collection of local information near the robot;
   a first remote terminal configured to remotely operate the operation of the robot, generate an operation signal indicative of a moving operation and an imaging operation, and execute the moving operation and the imaging operation in accordance with the operation signal; and
   a second remote terminal configured to remotely communicate with the first remote terminal, wherein
   the second remote terminal outputs the local information acquired from the robot to a user,
   the second remote terminal detects user's interest in the output local information;
   the user associated with the second remote terminal experiences a sightseeing tour via the robot that is remotely operated by the first remote terminal the second remote terminal is configured to notify the first remote terminal of interest information indicating the detected interest;
the first remote terminal is configured to output the interest information that has been sent;
the first remote terminal highlights a position that corresponds to the interest information on a display screen that displays the local information; and
the first remote terminal is configured to superimpose a heat map on an image captured by the robot, the heat map being displayed in accordance with the user's interest.

\* \* \* \* \*